2,914,558

PREPARATION OF ARYLOXYALIPHATIC ACID SUBSTANCES

Harry D. Cooper, Walled Lake, Mich., assignor to Ethyl Corporation, New York, N.Y., a corporation of Delaware No Drawing. Application June 30, 1953
Serial No. 365,281

8 Claims. (Cl. 260—521)

This invention relates to the preparation of aryloxyaliphatic acids and more particularly to a new and improved process for the manufacture of 2,4,5-trichlorophenoxyacetic acid and similar materials.

An object of this invention is to provide a new and improved process for the manufacture of aryloxyaliphatic acid substances, useful as herbicides, plasticizers, chemical intermediates, and the like. A further object is to provide a process for the manufacture of aryloxyaliphatic acids beginning with aryl halides and characterized by the fact that the reaction mixture from hydrolysis of aryl halides is directly converted to aryloxyaliphatic acids without isolation of intermediate products. Another object is to provide a new and improved process for the manufacture of polyhalophenoxyacetic acids. Still another object is to provide a process for the production of trichlorophenoxyacetic acids. A specific object is to provide a new and improved process for the preparation of 2,4,5-T. Still another object is to provide a new and improved process for the manufacture of dichlorophenoxyacetic acids. A specific object is to provide a process for the manufacture of 2,4-D. Still another specific object is to provide a new and improved process for the production of 2,5-D.

2,4,5-T is conveniently made by hydrolysis of 1,2,4,5-tetrachlorobenzene with an alkaline hydrolysis agent to 2,4,5-trichlorophenol and subsequent condensation of the 2,4,5-trichlorophenol in the form of a salt with a salt of chloroacetic acid. It is desirable to use an alcohol as the medium for the aforementioned hydrolysis step, and methanol is generally the alcohol preferred by the art, as use of higher alcohols leads to excessive ether formation. The prior art has always taught that the product mixture from such a hydrolysis is treated to remove methanol, and the 2,4,5-trichlorophenol salt is then reacted with chloroacetic acid salt in aqueous medium to obtain the desired 2,4,5-T. The same general procedure has been used for preparation of other aryloxyaliphatic acid substances.

By aryloxyaliphatic acid substances I mean either the free aryloxyaliphatic acids or their salts.

The discovery has now been made that the crude reaction mixture obtained by hydrolysis of an aryl halide with an alkaline material, such as alkali or alkaline earth metal hydroxide, oxide, alcoholate, hydride, amide, and the like, in methanol can be treated directly with a salt of a haloaliphatic acid to produce the desired aryloxyaliphatic acid substance directly. This eliminates the necessity for isolation of the intermediate phenol and the necessity for removal of methanol from the hydrolysis mixture. In accordance with this invention an aryl halide, an alkaline hydrolysis agent, and methanol are mixed, heated for a time sufficient to hydrolyze a halogen atom of the aryl halide, and then either chloroacetic acid or its salt is added to the resulting reaction mixture, and this new admixture heated until condensation to form an aryloxyaliphatic acid is at least essentially complete.

By use of my invention it is possible to prepare aryloxyaliphatic acids from aryl halides with fewer processing steps than has heretofore been possible and, moreover, with lower equipment costs, easier handling requirements, and in many cases higher conversion of aryl halide to aryloxyaliphatic acid. One of the primary advantages of the present invention lies in the fact that hydrolysis of haloaliphatic acid, which contributes heavily toward lowering of yields in aqueous processes, is avoided. My invention is adaptable to continuous or batch operation.

In general it is preferred that the ratio of alkaline hydrolysis material to aryl halide be in the range of 1.5 to 3 equivalents of alkaline hydrolysis agent per equivalent of aryl halide, and that the hydrolysis reaction be conducted in the presence of 10 to 20 moles of methanol per mole of aryl halide. Preferred temperature for the hydrolysis reaction lies in the range of 150–200° C., and preferred pressures are the corresponding vapor pressure of the system at the temperature employed. The usual times of hydrolysis reaction are 1 to 8 hours.

With regard to the condensation step, the ratio of reactants is 1 to 1.5 moles of chloroacetic acid salt per mole of aryl halide originally reacted. Preferred temperatures are on the order of 100–150° C., and times of reaction usually vary between 0.5 to 5 hours.

One feature of the present invention is that, particularly when excess alkaline hydrolysis agent is used, the chloroacetic acid reactant may be charged either wholly or partly as the free acid rather than the salt. The excess alkaline hydrolysis agent present in the reaction mixture converts any free chloroacetic acid to its salt. Alternately, the chloroacetic acid can be charged wholly or partly in the form of the salt, or it can be charged in the form of the free acid and additional alkaline material added to convert it to the salt form.

The following non-limiting example illustrates the present invention:

Example

One equivalent of 1,2,4,5-tetrachlorobenzene was reacted with 2.5 equivalents of sodium hydroxide in the presence of 12.5 equivalents of methanol as the reaction medium. The hydrolysis was carried out for 2 hours at 180° C. At the end of this time the mixture was treated directly with 0.5 equivalent of free chloroacetic acid and 0.5 equivalent of sodium chloroacetate. The new reaction mxture was heated at 120° C. for 1.75 hours. At the end of this time the reaction mixture was diluted with water and filtered, yielding a precipitate consisting essentially of sodium 2,4,5-trichlorophenoxyacetate. This product was slurried with concentrated hydrochloric acid and the resulting 2,4,5-T separated by filtration and extracted with cyclohexane to remove unreacted 2,4,5-trichlorophenol. The purified 2,4,5-T was then filtered and dried at elevated temperature. A 65 percent yield of 2,4,5-T, based on 1,2,4,5-tetrachlorobenzene charged to the reactor, was obtained. The product had a melting point of 146–150° C.

When the chloroacetic acid is added entirely as the sodium salt rather than partially as the salt and partially as the free acid, equally good results are obtained. For example, when the product prepared by reaction of 1 equivalent of 1,2,4,5-tetrachlorobenzene with 2.2 equivalents of sodium hydroxide and 12.5 equivalents of methanol at 160° C. is treated with 1.2 moles of sodium chloroacetate for 3 to 5 hours at 110° C., a good yield of 2,4,5-T is obtained.

When this procedure is repeated at hydrolysis temperatures in the range 150–200° C. and condensation temperatures in the range 100–150° C., similar results are obtained. Good results are obtained with the ratio of sodium hydroxide to 1,2,4,5-tetrachlorobenzene varying between 1.5 and 3 equivalents of sodium hydroxide per equivalent of tetrachlorobenzene and with ratios of methanol to 1,2,4,5-tetrachlorobenzene varying between 10 and 20 moles of methanol per mole of tetrachlorobenzene. Good results are obtained when the amount of chloroacetic acid varies between 1 and 1.5 moles per mole of tetrachlorobenzene and when the condensation temperature varies between 100 and 150° C.

Although the reaction has been specifically illustrated, it is to be understood that other aryl halides, such as chlorobenzene, dichlorobenzenes, trichlorobenzenes such as 1,2,3- and 1,2,4-trichlorobenzene, chloronaphthalenes, polychloronaphthalenes, and the like, are employed. Good results are obtained with other alkaline hydrolysis agents, such as potassium hydroxide, calcium hydroxide, ammonium hydroxide, calcium oxide, barium oxide, sodium methylate, sodium ethylate, potassium methylate, and the like. Good results are also obtained with other haloaliphatic acids, such as bromoacetic acid, α-chloropropionic acid, α-chlorobutyric acid, and the like.

I claim:

1. Process for the manufacture of alkali metal salts of polychloroaryloxy aliphatic acids, comprising reacting in methanol medium for from about 0.5 to about 3 hours at a temperature of 100–150° C. an alkali metal salt of a polychlorophenol with an alkali metal salt of a lower saturated alpha-haloaliphatic acid.

2. Process for the manufacture of an aryloxyaliphatic acid substance, comprising reacting in methanol medium for from about 0.5 to about 5 hours at a temperature of 100–150° C. (1) 1–1.5 equivalents of a salt of a haloaliphatic acid selected from the group consisting of haloacetic acids, alpha halopropionic acids and alpha halobutyric acids with (2) one equivalent of the reaction mixture obtained by reacting one equivalent of an aryl halide selected from the group consisting of phenyl halides and naphthyl halides with 1.5–3 equivalents of an alkaline hydrolysis agent in methanol medium for from 1 to 8 hours at a temperature of 150–200° C.

3. A process of preparing aryloxyaliphatic substances, comprising forming a mixture of (1) one equivalent of an aryl halide selected from the group consisting of phenyl halides and naphthyl halides, (2) 1.5–3 equivalents of an alkaline hydrolysis agent and (3) methanol, heating said mixture for from about 1 to about 8 hours at a temperature of 150–200° C., adding 1–1.5 equivalents of a salt of a haloaliphatic acid selected from the group consisting of haloacetic acids, alpha halopropionic acids and alpha halobutyric acids to the resulting reaction product mixture, and continuing heating at a temperature of 100–150° C. for from about 0.5 to about 8 hours.

4. Process of claim 1 in which the aryloxyaliphatic acid is a phenoxyacetic acid, the haloaliphatic acid is a haloacetic acid, and the aryl halide is a phenyl halide.

5. Process of claim 1 in which the aryloxyaliphatic acid is 2,4,5-trichlorophenoxyacetic acid, the haloaliphatic acid is chloroacetic acid, and the aryl halide is 1,2,4,5-tetrachlorobenzene.

6. Process for the manufacture of sodium 2,4,5-trichlorophenoxyacetate, comprising hydrolyzing 1 equivalent of 1,2,4,5-tetrachlorobenzene with 1.5–3 equivalents of sodium hydroxide in the presence of 10–20 equivalents of methanol as the reaction medium at a temperature of 150–200° C. for 1–8 hours, then reacting the reaction mixture with 1–1.5 equivalents of sodium chloroacetate at a temperature of 100–150° C. for 0.5–5 hours, and recovering sodium 2,4,5-trichlorophenoxyacetate from the reaction mixture.

7. Process of claim 6 further defined in that the sodium 2,4,5-trichlorophenoxyacetate is subsequently acidified to yield 2,4,5-trichlorophenoxyacetic acid.

8. Process for the manufacture of alkali metal salts of polychloroaryloxy aliphatic acids, comprising reacting in methanol medium for from about 0.5 to about 3.5 hours at a temperature of 110°–140° C. an alkali metal salt of a polychlorophenol with an alkali metal salt of a haloacetic acid.

References Cited in the file of this patent

UNITED STATES PATENTS

| | | |
|---|---|---|
| 2,480,817 | Warren | Aug. 30, 1949 |
| 2,493,126 | Foster et al. | Jan. 3, 1950 |
| 2,509,245 | Nikawitz et al. | May 30, 1950 |
| 2,509,772 | Leaper | May 30, 1950 |
| 2,516,611 | Berhenke | July 25, 1950 |
| 2,656,382 | Kulka et al. | Oct. 20, 1953 |
| 2,665,314 | Krantz | Jan. 5, 1954 |

FOREIGN PATENTS

| | | |
|---|---|---|
| 573,476 | Great Britain | Nov. 22, 1945 |
| 573,479 | Great Britain | Nov. 22, 1945 |

OTHER REFERENCES

Harrison et al., J. Chem. Soc., Vol. 1943, pgs. 235–7.